United States Patent [19]

Selinko

[11] 4,020,244
[45] Apr. 26, 1977

[54] CLAMPING STRUCTURE FOR BATTERY CELLS

[75] Inventor: George Joseph Selinko, Lighthouse Point, Fla.

[73] Assignee: Motorola, Inc., Schaumburg, Ill.

[22] Filed: Mar. 3, 1976

[21] Appl. No.: 663,398

Related U.S. Application Data

[63] Continuation-in-part of Ser. No. 550,253, Feb. 18, 1975, abandoned.

[52] U.S. Cl. ............................................. 429/100
[51] Int. Cl.² .......................................... H01M 2/10
[58] Field of Search ............. 429/96, 100; 206/333, 206/83.5

[56] References Cited
UNITED STATES PATENTS

| | | | |
|---|---|---|---|
| 1,842,380 | 1/1932 | Andrews | 136/108 |
| 2,768,230 | 10/1956 | Roberts | 136/173 |
| 2,915,208 | 12/1959 | Benscholer | 206/83.5 |

Primary Examiner—John H. Mack
Assistant Examiner—H. A. Feeley

Attorney, Agent, or Firm—Donald B. Southard; James W. Gillman

[57] ABSTRACT

A structure for clamping a plurality of battery cells to prevent deformation thereof, includes a pair of pressure plates positioned against the ends of a stack of battery cells and a plurality of bands which extend around the cells and the end plates to hold the end plates in fixed position with respect to each other. The structure can be used with a plurality of sealed cells of rectangular configuration to pevent expansion of the cells of the type where pressure can build up therein, such as ni-clad rechargeable batteries, and thereby prevent bulging of the electrodes of the cells to injure the same. The pressure plates can be made of steel to also serve as heat sinks during welding of the bands, and the bands can be formed of steel strips which are preferably cinched tight about the cells and welded together. Partitions can be positioned between adjacent cells, with edges welded to the bands to prevent expansion of the cellsin a direction parallel to the pressure plates.

8 Claims, 2 Drawing Figures

CLAMPING STRUCTURE FOR BATTERY CELLS

BACKGROUND OF THE INVENTION

The present application is a continuation in part of application Ser. No. 550,253, filed Feb. 18, 1975, now abandoned.

Batteries for use in portable electrical devices often include a plurality of cells which are electrically connected to provide the voltage and current requirments desired. Such cells may be of rechargeable type wherein gasses are developed during charging which cause the build-up of pressure in cells which are sealed. Some cells are vented to relieve the pressure but substantial cost is involved in providing a venting structure which will not allow entry of foreign material into the cell and not allow spilling of the electrolyte from the cell. It is almost impossible to provide a venting structure which will permit escape of gasses and not permit escape of the electrolyte, which is a corrosive and otherwise dangerous substance.

Battery cells have been provided within a rigid housing to hold the elements therein against bulging, but to provide such a housing with small dimensional tolerances also involves substantial cost. Structures have been provided for holding stacks of cells together using bolts with pre-loading springs acting on the end cells. These structures are all complicated and require additional space about the cells, which is undesirable, particularly in batteries used in portable devices. The size and cost of the prior devices for holding cells has made the same objectionable for many applications.

SUMMARY OF THE INVENTION

It is an object of this invention to provide a simple and inexpensive structure to secure a stack of battery cells.

Another object of the invention is to provide a clamping structure for a stack of rectangular sealed battery cells to prevent deformation of the cells in response to the build-up of pressure within the cells.

A further object of the invention is to provide a clamping structure for a stack of battery cells which does not require close tolerances and can be formed of simple components so that it can be provided at low cost.

Still another object of the invention is to provide a prismatic battery cell stack with a structure for preventing expansion of the sealed cells thereof which does significantly increase the size of the battery unit.

The clamping structure of the invention is adapted to be used with a stack of rectangular sealed battery cells, and includes a pair of pressure plates positioned at the ends of the cell stack, and a plurality of bands about the stack and the end pressure plates. The bands can be formed of steel straps which, in their preferred form, are cinched tight and welded together to hold the pressure plates in fixed positions with respect to each other. The pressure plates are also formed of steel and can be of a thickness and mass to form heat sinks to prevent the heat developed by welding of the straps from damaging the cells. Partitions or septums fromed of sheet steel can be positioned between adjacent cells in the stack and have edges welded to the bands to prevent expansion of the cells in a direction parallel to the pressure plates. The clamping structure prevents bulging of the cells, which would cause separation of the electrodes therein, as well as lateral bulging of the stack, which might cause the electrodes to shift in position, and ultimately rupture of a close fitting battery housing. The structure in its preferred form is formed by elements of simple and inexpensive construction and which do not require close tolerances, so that the overall cost of the structure is very small.

DETAILED DESCRIPTION OF THE DRAWINGS

Figure 1:
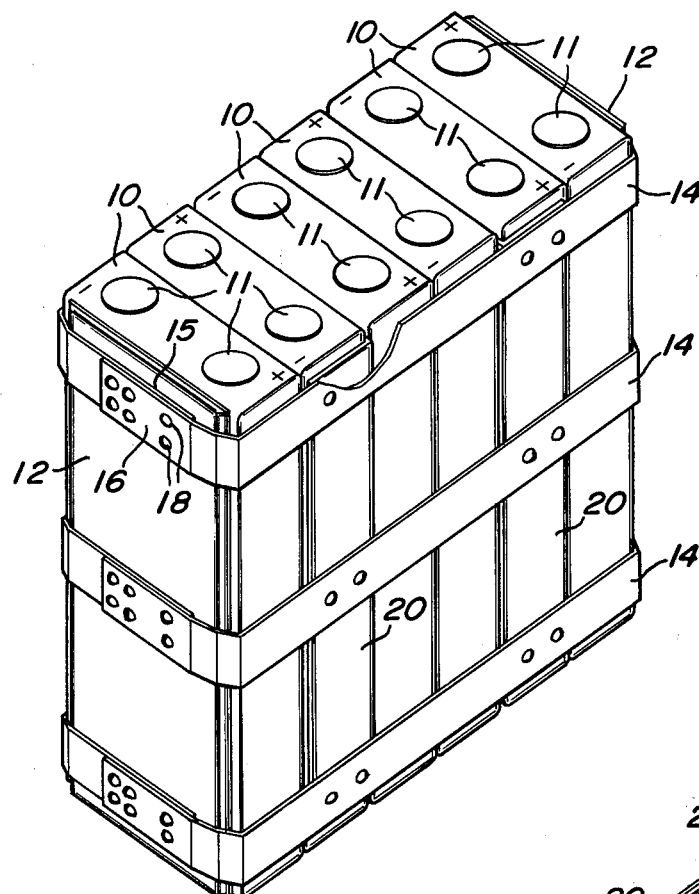
FIG. 1 is a perspective view of a battery cell stack including the clamping structure of the invention.

In FIG. 1, a plurality of cells 10 of rectangular shape are arranged in a stack, with the larger sides of the cells positioned adjacent each other. The cells 10 may be of the nickel-cadmium type of known construction, and each includes a plurality of electrodes and an electrolyte in a sealed-housing. The cells are arranged so that the terminals 11 of adjacent cells which are of opposite polarity are next to each other to facilitate connection of the cells 10 in series so that the voltages thereof are additive. It will be apparent that the cells can be arranged in various manners to satisfy the voltage and current requirements desired.

Figure 2:
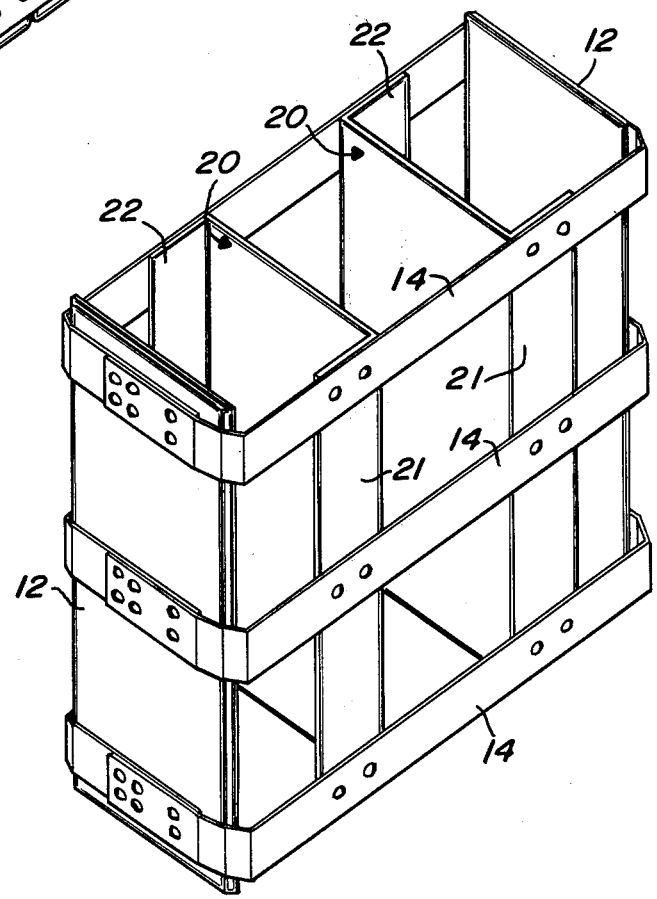
FIG. 2 is a perspective view of the clamping structure alone.

In the preferred form, a pair of pressure plates 12, best shown in FIG. 2, are positioned against the larger outer sides of the end cells 10 in the stack. The plates 12 may have a size to substantially cover the adjacent sides of the cells, and may be formed of steel of a thickness to be substantially rigid. A plurality of bands 14 are provided about the cells 10 and the pressure plates 12. The bands 14 are formed by strips of steel having ends 15 and 16 which are cinched tight about the cells 10 and the end plates 12, and the ends are overlapped and spot welded, as shown at points 18. This forms a pre-tightened band which holds the pressure plates 12 in fixed position with respect to each other and prevents expansion of the cells 10 across the thickness thereof.

It may also be desired to use partitions or septums 20 between adjacent cells to prevent transverse expansion of the cell stack. The septums 20 have right angle edges 21 and 22 which engage the bands 14, and which are spot welded thereto. This further holds the cells against expansion due to the build-up of gas pressure therein.

The pressure plates 12 may have sufficient mass that they also serve as heat sinks. This is important during the spot welding (18) of the bands 14, as it removes the heat generated during welding so that the adjacent battery cell 10 is not damaged. During welding of the bands 14 to the septums 20, a brass strip can be inserted between the septum and the cell to remove heat, so that the cell is not damaged by the heat.

The clamping structure of the invention has been found to be highly effective to prevent damage to the cells, resulting from expansion thereof due to the build-up of gasses within the sealed cells, as during charging. Any expansion of the cells can cause bulging of the electrodes to impair the operation of the cells.

The structure of the invention in its preferred form is constructed of simple and inexpensive components which have no critical tolerances. The pressure plates and strips can be cut from sheet steel. The septums can also be formed of sheet metal and the edges can be bent by use of a very simple tool. Accordingly, the clamping structure can be provided and applied to a cell stack at very small cost.

I claim:

1. A self-supporting battery cell clamping structure for use with a stack of rechargeable battery cells to prevent expansion of the cells in response to the build-up of pressure therein, including in combination.
   first and second pressure plates for positioning against substantially the entire surface area presented by the ends of the stack of cells, and
   a plurality of strips adapted for positioning about the stack of cells and engaging said pressure plates, said strips each having ends secured together to form a pre-tightented band to hold said pressure plates against movement with respect to each other and prevent expansion of the cells positioned between said plates.

2. The structure of claim 1 wherein said plates and said strips are made of steel, and said ends of said strips are secured together by welding.

3. The structure of claim 2 wherein said pressure plates have sufficient mass to form heat sinks to remove heat developed during welding of said strips.

4. The structure of claim 1 further including a partition positioned between a pair of adjacent cells in the stack, said partition being secured to said strips to prevent expansion of the cells in a direction parallel to said pressure plates.

5. The structure of claim 4 wherein said partition has right angle edges engaging said strips and welded thereto to hold said strips at a fixed spacing.

6. A battery structure including in combination,
   a plurality of rectangular, sealed, rechargeable battery cells each having a first pair of substantially parallel sides, said cells being arranged in a stack with one parallel side of each cell adjacent one parallel side of another cell,
   first and second pressure plates each engaging substantially the entire surface area of the parallel outer side of said cell at one end of said stack, and
   a plurality of bands about said cells and said pressure plates, each of said bands being formed by a strip having ends cinched tight about said cells and said pressure plates and secured together to hold said plates against said cells.

7. The battery structure of claim 6 further including a septum positioned between parallel sides of adjacent cells and secured to said bands to hold said bands in fixed position.

8. The battery structure of claim 7 wherein said pressure plates, said bands and said septum are formed of steel, and said ends of sid strips are welded together, and said septum is welded to said bands.

* * * * *